United States Patent [19]

Lee et al.

[11] 4,456,972

[45] Jun. 26, 1984

[54] KEYBOARD IDENTIFICATION SEQUENCE

[75] Inventors: E. Paul Lee, Acton; Frederick H. McCormick, Billerica, both of Mass.; Dennis P. Vietmeier; Neal C. Harrington, both of Freeport, Ill.; Donald R. Clothier, Rockford, Ill.

[73] Assignee: Honeywell Information Systems Inc., Waltham, Mass.

[21] Appl. No.: 352,442

[22] Filed: Feb. 25, 1982

[51] Int. Cl.³ .............................................. G06F 15/02
[52] U.S. Cl. ....................................................... 364/900
[58] Field of Search ... 364/200 MS File, 900 MS File, 364/709

[56] References Cited

U.S. PATENT DOCUMENTS

3,706,973  12/1972  Acquandro et al. ............... 364/900
4,200,913   4/1980  Kuhar et al. ........................ 364/900

Primary Examiner—Felix D. Gruber
Assistant Examiner—Oleg Schatoff
Attorney, Agent, or Firm—Nicholas Prasinos

[57] ABSTRACT

In combination with a host processor CPU, means are provided to a standard computer terminal keyboard to reconfigure an identity change of the keyboard for another use/uses and to identify its new configuration, status and other vital information to the host CPU.

6 Claims, 6 Drawing Figures

KEYBOARD IDENTIFICATION SEQUENCE

BACKGROUND OF THE INVENTION

1. Field of the Invention

This invention relates to terminals and more particularly to identification of a keyboard or a terminal or a computer host system.

2. Description of the Prior Art

Terminal or keyboard identity is normally accomplished by a configuration of hard wire jumper wires situated on the keyboard in conjunction with a character generator, IC chip for character display purposes and/or an ASCII conversion table (Look UP Table) IC chip. Both the character generator (C.G.) and Look UP Table (L.T.) are located externally from the keyboard. In order to reconfigure or change the identity of the terminal or keyboard for another use (i.e., use French language keyboard instead of English language keboard), the jumpers on the keyboard would have to be physically removed or added. Also the C.G. and/or L.T. must be removed and replaced with I.C. chips associated with that specific keyboard configuration. This process requires considerable time, extensive documentation and hardware retrofit, thereby requiring a vast inventory stock of each type of keyboard.

What is needed is an improved keyboard that can easily be configured to support a variety of product types, thereby substantially reducing specific keyboard inventory stock, both in-house and in the field. Thus substantial savings and a competitive advantage would result.

OBJECTS OF THE INVENTION

It is a key object of the invention to provide a new improved means of keyboard identification.

It is another object of the invention to provide a keyboard that can easily be configured to support a variety of product lines, thereby substantially reducing specific keyboard inventory stock, both in-house and in the field.

It is also an object of the invention to provide a simple keyboard configuration technique.

SUMMARY OF THE INVENTION

The above objects are achieved according to the invention by providing in combination a host computer, a standard terminal keyboard, means for configuring the keyboard for a number of predetermined products, and means for identifying its configuration and for providing status information to the terminal or host computer system as required. This is accomplished according to a preferred embodiment of the invention by providing interface means to send data interface signals comprising an identifier sequence after initially being polled by the host computer. Upon receipt of this identifier sequence, the host computer will know what type of keyboard it has attached, whether that keyboard is on-line or off-line and the mode in which the keyboard is operating.

By assigning a unique eight bit code (byte) to each specific configuration of the keyboard, the host system is able to poll at will all the keyboards to which it is coupled simply by toggling a signal on the keyboard which has been named the Data Set Ready signal. This toggling commands the keyboard to identify itself by transmitting its identifier (ID) byte. A five position DIP switch, mounted on the keyboard, determines the five least significant bits (0-4) for the identifier byte, whereas the three most significant bits (5-7) are preset by the keyboard firmware.

DESCRIPTION OF THE PREFERRED EMBODIMENT

Figure 1:
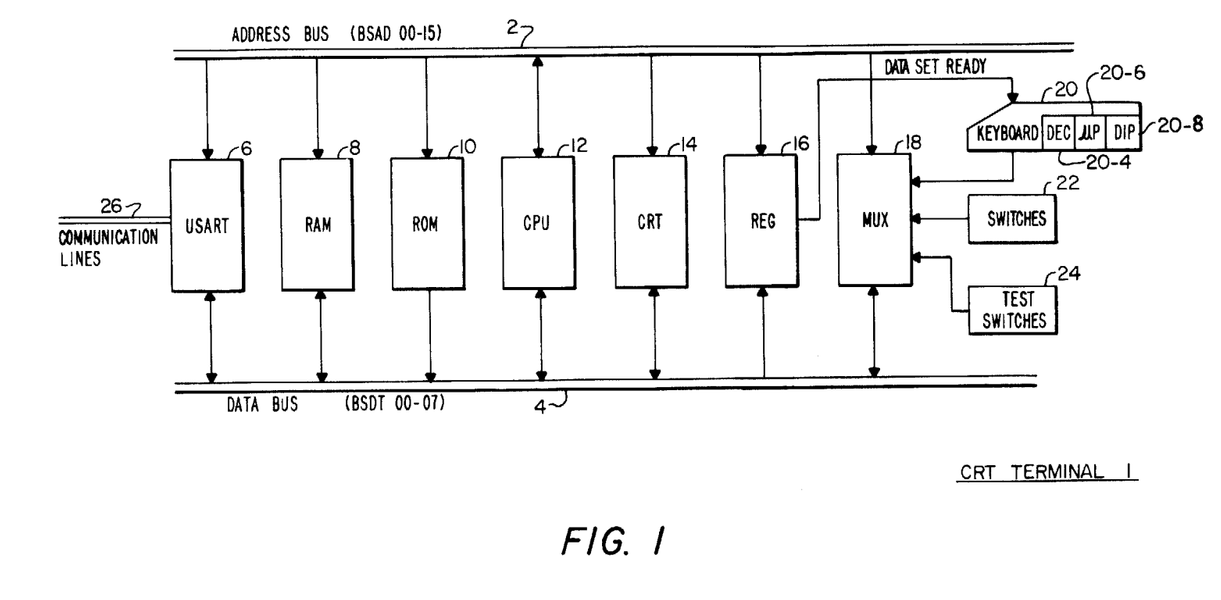
FIG. 1 is a block diagram of the invention.

FIG. 1 shows an overall block diagram of the CRT terminal 1 which includes in combination the invention, an address bus 2 having 16 signal lines BSAD 00-15, and a data bus 4 having 8 signal lines BSDT 00-07. A central processing unit (CPU) 12 controls the CRT terminal 1 operation in conjunction with a read only memory (ROM) 10 which stores microprograms and a random access memory (RAM) 8 which stores variable information, all coupled in common to address bus 2 and data bus 4.

A universal synchronous, asynchronous, receive and transmit terminal (USART) 6 coupled to address bus 2 and data bus 4 transfers information between remote terminals or host processors and the CRT terminal 1 via communication lines 26.

CRT 14 coupled to address bus 2 and data bus 4 displays information received over data bus 4 on a cathode ray tube display.

In a typical operation, the USART 6 may receive data from the communication lines 26 and inform the CRT terminal 1 by interrupting the CPU 12. CPU 12 addresses the ROM 10 to address a microprogram. The microinstructions of the microprogram appear on the data bus 4 and are received by the CPU 12 which executes the microinstructions. This results in the data being received by the USART 6 over communication lines 26 being stored in RAM 8 in address locations specified by the CPU 12 and then displayed on the CRT screen in CRT 14.

Also coupled to the address bus 2 and the data bus 4 is a multiplexer 18 which couples a keyboard 20 which has a decoder 20-4, microprocessor 20-6 and a DIP switch 20-8. A switch box 22 and test switches 24 to the address bus 2 and the data bus 4 are also coupled to the keyboard. The test switches 24 are used during a maintenance operation to test the CRT terminal 1. The keyboard 20 is used by an operation to manually input data. Under CPU 12 control, operator-entered data via keyboard 20 appears on data bus 4 via MUX 18 and is stored in RAM 8 at address locations specified by CPU 12.

A register 16 is responsive to selected addresses received via address bus 2 to store certain data bits received via data bus 4. As an example, an address configuration of hexadecimal 0806 (binary 0000100000000110) received over signal lines BSAD 00-15 could result in a data byte $10_{16}$ result in a Data Set Ready (DSR) signal being stored in register 16.

Figure 2:
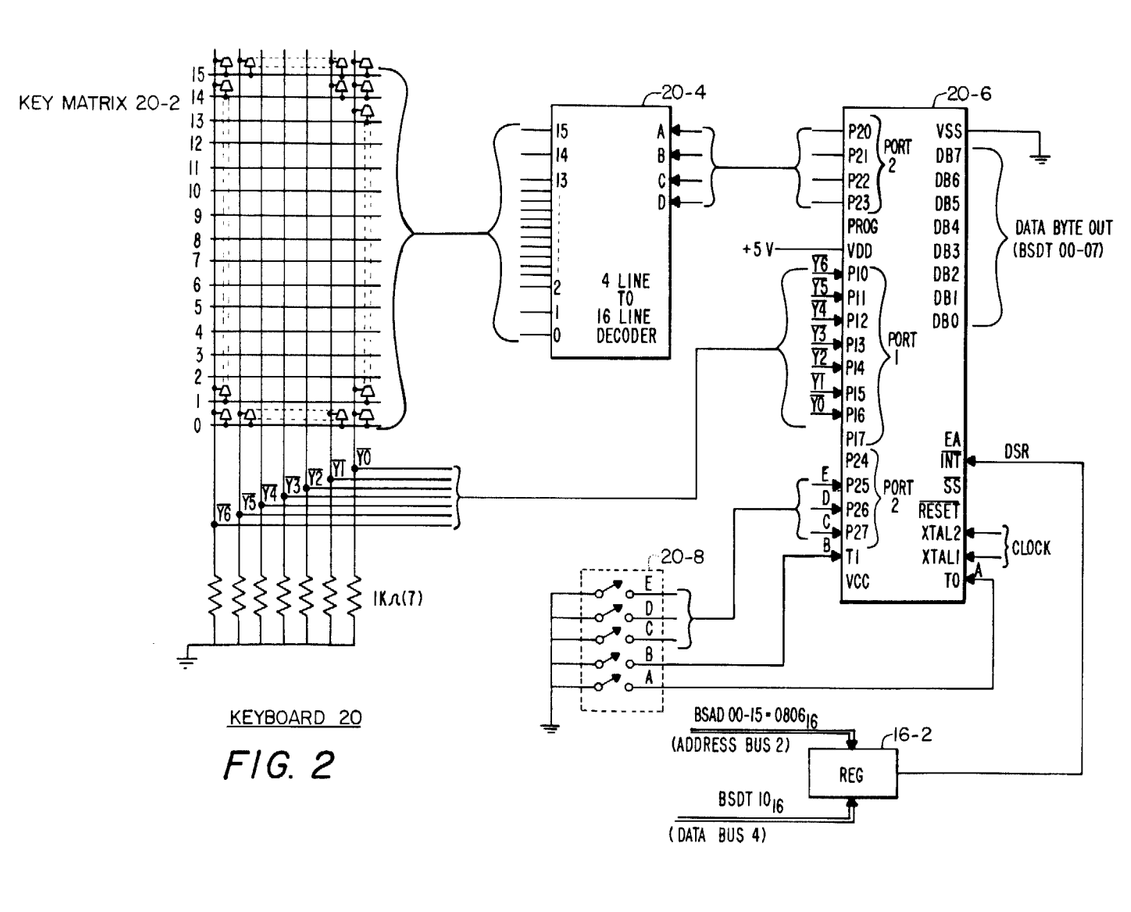
FIG. 2 is a detailed logic block diagram of the invention.

FIG. 2 shows some of the detailed logic of the keyboard 20 having a maximum of 112 keys wired in a 16×7 matrix in keyboard key matrix 20-2. The keyboard 20 is controlled by a microprocessor 20-6 which is an Intel 8048/8748 microprocessor.

A 4-line to 16-line decoder 20-4 accepts 4-bit signals from terminals P20-P23 of microprocessor 20-6 to generate 1 to 16 select lines to query the keyboard key matrix 20-2. A key depressed in a selected line would generate an appropriate signal $\overline{Y0}$ through $\overline{Y6}$ through a 1K resistor which is applied to terminals P16 through P10 of microprocessor 20-6. Each key depression results in a selected code Y0 through Y6 being received by the microprocessor 20-6 and an appropriate ASCII code or other desired code sent out on data bus 4 through terminals DB 0-7.

Dual Inline Package (DIP) switches A-E 20-8 are applied to terminals T0, T1, and P27-P25 of microprocessor 20-6. A particular switch configuration identifies the keyboard 20 as to some of the codes put out when certain keys of keyboard key matrix 20-2 are depressed. For example, this flexibility is needed where the CRT terminal 1 is installed in different countries. This allows for a single keyboard design which may be adapted to the coding in different countries by changing the switch 20-8 configuration. This flexibility is also needed when the keyboard 20 is used in different CRT terminal products or for different CRT terminal applications.

Figure 4:
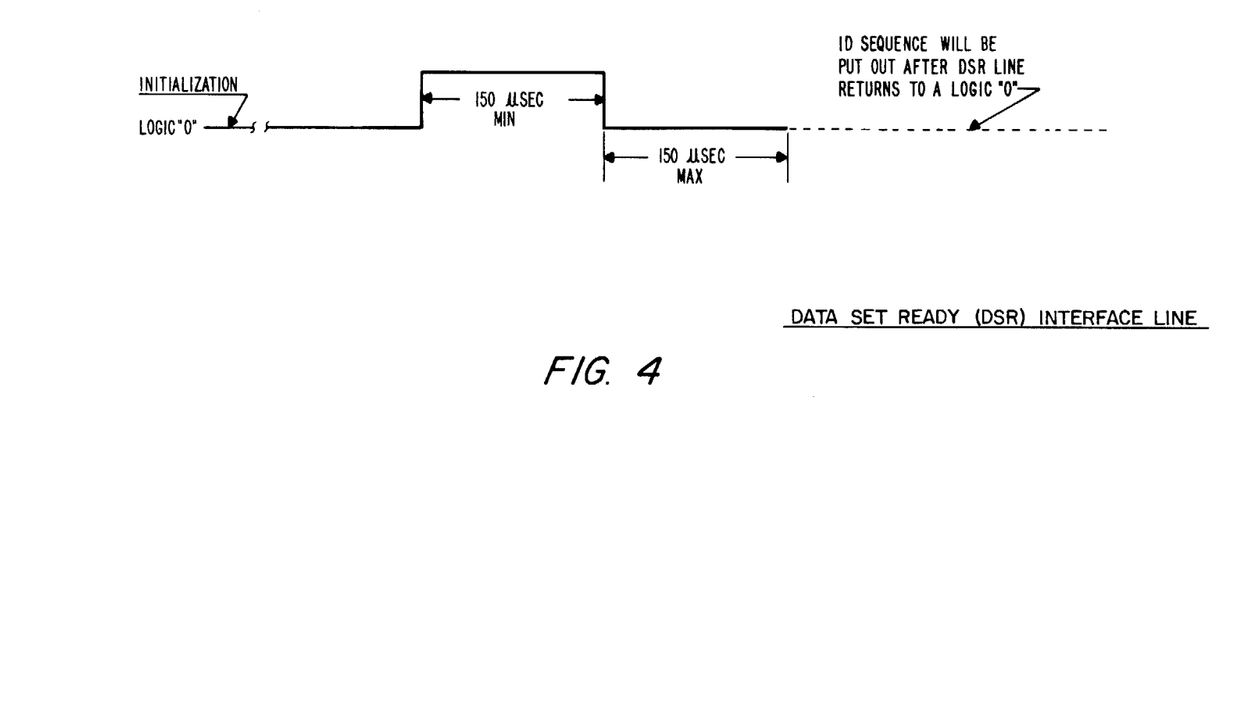
FIG. 4 is a timing diagram of the Data Set Ready (DSR) signal.

The CPU 12 forces the DSR (Data Set Ready) signal by sending out a hexadecimal 0806 on the address bus 2 for activating register 16-2 and writing hexadecimal 10 on the data bus. The DSR signal (see FIG. 4) applied to the interrupt terminal of microprocessor 20-6 forces a microprocessor sequence which reads the state of the switches A-E of switch bank 20-8 and the state of the auto line feed and local keys and transfers the information to CPU 12 which verifies that the keyboard 20 will send out the proper data codes.

Figure 3:
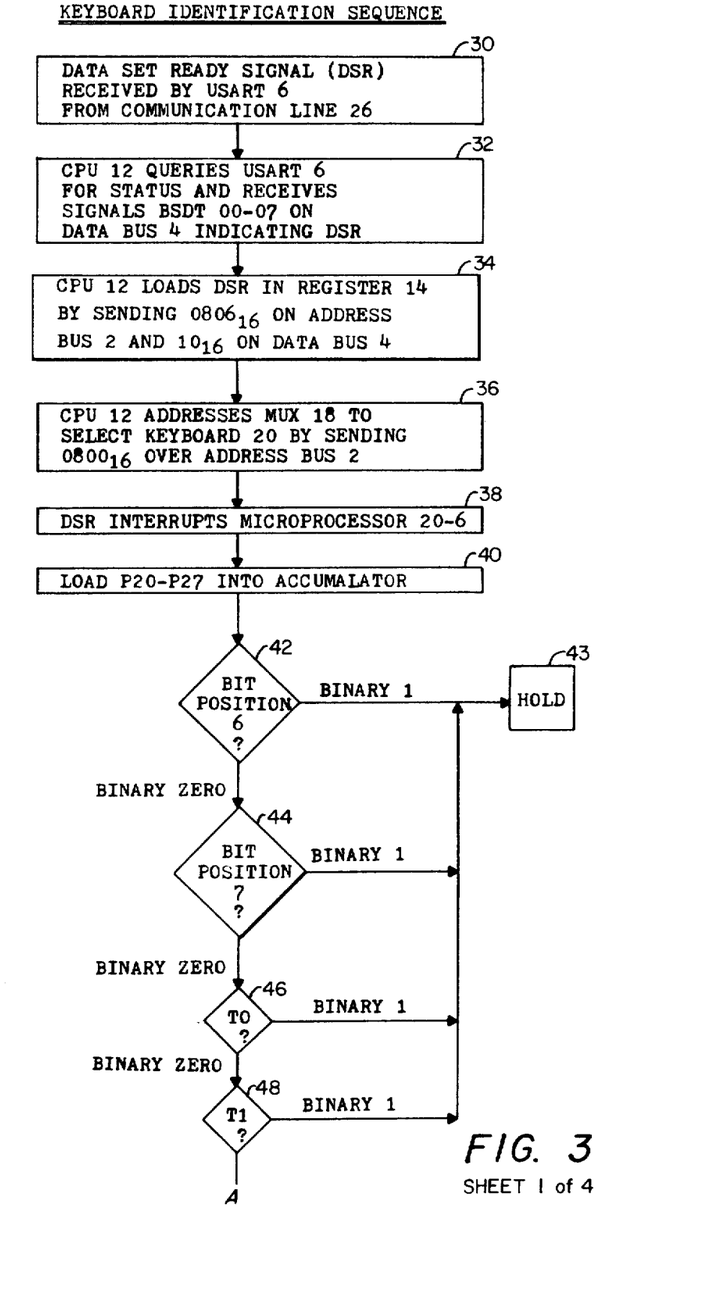
FIG. 3 is a flow chart of machine operations for the identification sequence of the invention.

FIG. 3 shows a flow diagram of machine operations which verifies that the switch 20-8 settings A, B, C, D and E correctly identify the keyboard 20 that is operative with the CRT terminal and also indicate to the CPU 12 whether the auto line feed or the local keys are activated.

Assuming that keyboard 20 has an identification number of hexadecimal C2 which is established by switches A, B, C and D in an ON condition and switch E is in an OFF condition. This sets microprocessor 20-6 terminals T0, T1, P27 and P26 to logical ZERO and terminal P25 to logical ONE.

The keyboard identification sequence starts in block 30 when the Data Set Ready (DSR) signal is received by the USART 6 from communication lines 26, or during a CRT terminal power-up sequence.

In block 30, the CPU 12 queries USART 6 for its status information and receives the DSR status by decoding the BSDT 0-7 signals on data bus 4.

The CPU 12 in block 34 loads register 16 with the DSR signal by sending out hexadecimal 0806 on the address bus 2 to load register 16 with hexadecimal 10 on data bus 4.

In block 36, the CPU 12 sends out hexadecimal 0800 on address bus 2 which results in MUX 18 selecting keyboard 20 signals.

The DSR signal in block 38 applied to the INT interrupt terminal of microprocessor 20-6 initiates a keyboard identification microprogram sequence.

In block 40, the condition of the switch bank 20-8 switches C, D and E applied to terminals P27, P26 and P25 are read into the accumulator (not shown) of microprocessor 20-6.

In block 42, bit position 6 of the accumulator is tested. A binary ZERO indicates that switch D is ON. A binary ONE indicates that switch D is OFF, which is an incorrect position and the microprogram branches to a hold state. This is a signal for field maintenance personnel to intervene.

Similarly in block 44, switch C is tested to determine if it is ON by testing bit position 7 of the accumulator for binary ZERO. If there is binary ONE in that bit position, there is a branch to hold.

In block 46, the T0 terminal of microprocessor 20-6 is tested, while in block 48 the T1 terminal for binary ZERO's, indicating that switches A and B respectively are ON, is tested. A binary ONE will result in the microprogram branching to hold.

The position of switch E is examined by testing bit position 5 of the accumulator in block 50. A binary ZERO, switch E ON, indicates that the coded output on data bus 4 of the keyboard 20 identifies the key number of key matrix 20-2, which is a "soft" keyboard. A binary ONE, switch E OFF, indicates that the coded output on data bus 4 of keyboard 20 is an ASCII character, a "hard" keyboard. For this example, the keyboard 20 is assumed "hard" and generates ASCII characters.

In block 52, register R0, the microprocessor 20-6 (64×8) random access memory (RAM) (not shown), is loaded with $42_{10}$ which is address location in the 64×8 RAM into which the keyboard identification characters are written.

The keyboard identification character $C2_{16}$ is written into the 64×8 RAM address location $42_{10}$ in block 54.

In block 56, register R0 is loaded with $37_{10}$; in block 58, the stop byte $91_{16}$ is loaded into 64×8 RAM address location $37_{10}$; and in block 60, register R0 is incremented to $38_{10}$.

Decision block 62 examines the condition of the local key. If it is not activated, then in block 63 $8B_{16}$ is loaded into location $38_{10}$. If the local key is activated, then in block 64 $8C_{16}$ is loaded into location $38_{10}$. The CRT terminal 1 is placed in a remote mode by the CPU 12 receiving the $8B_{16}$ code. During the remote mode, the CRT terminal 1 is on lines with the communication line 26.

The CPU 12 when receiving the $8C_{16}$ code in block 64 puts the CRT terminal 1 in an off-line mode.

In block 66, register R0 is incremented to $39_{10}$ and in block 68 the position of the auto line feed key is examined. If in block 69 the auto line feed key is not activated, than an $8D_{16}$ code is loaded into address location $39_{10}$. The CPU 12 when receiving the $8D_{16}$ code will send two characters, a carriage return and a line feed, to start the next line on the CRT display of CRT 14 when the return key is depressed. If the auto line feed key is not activated, then in block 70 an $8E_{16}$ code is loaded into address location $39_{10}$. The CPU 12 when receiving the $8E_{16}$ code will send only a carriage return when the return key is depressed.

Register R0 is incremented to $40_{10}$ in block 72 and in block 74 the keyboard identification characters $C2_{16}$ are then loaded into address location $40_{10}$ from address location $42_{10}$. This puts the keyboard identification characters in the proper sequence for later transfer to the CPU 12.

Register R0 is incremented to $41_{10}$ in block 76 and in block 78 the start byte $90_{16}$ is loaded into location $41_{10}$.

The number of characters 5, indicating the number of codes to be transferred to CPU 12 from keyboard 20, is loaded into a register R1 in the 16×8 RAM of microprocessor 20-6 in block 80.

The block 82, the 5 codes are sent to the CPU 12 by initially sending the start code $90_{16}$ stored in location $41_{10}$, decrementing register R0 in block 84, decrementing register R1 in block 86, and testing register R1 for $0_{10}$ in decision block 88. If register R1 does not store a $0_{10}$, then the firmware branches to block 82 to send the next code to CPU 12. The microprogram is completed in block 80 after the fifth character, stop code $91_{16}$, is sent to CPU 12 in block 82 and register R1 is decremented to $0_{10}$ in block 86. The keyboard is inoperative during the transmission of the above 5 code sequence.

Figure 5:
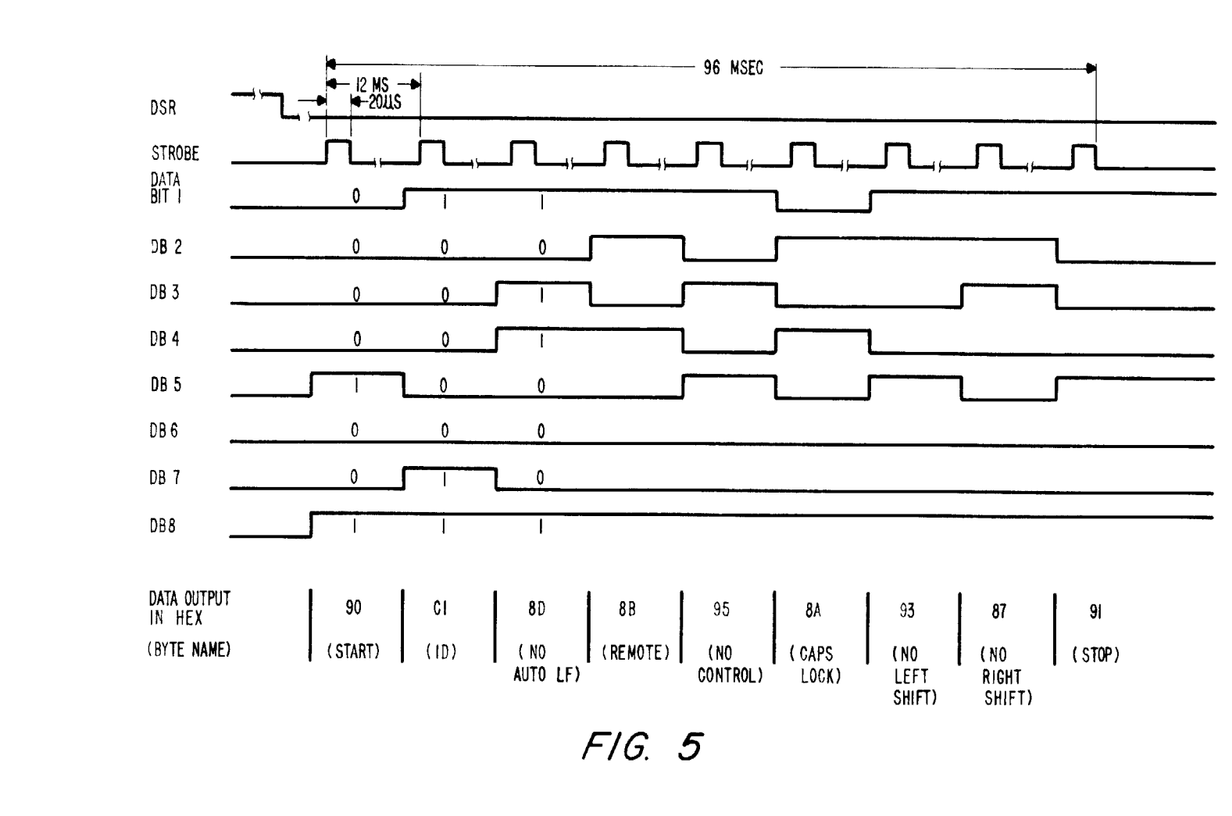
FIG. 5 is a timing diagram of the keyboard interface for a "soft" (key location code) keyboard.

FIG. 5 shows the timing diagram of a "soft" keyboard identifier sequence. This sequence informs the host that the keyboard is a "soft" version (i.e., key location code). In this version automatic line feed is not set, the shift and control keys are inactive, the caps lock key is active and the keyboard is in remote mode. The sequence is initiated by the host toggling the DSR line. This line remains high (2.4 VDC min.) for approximately 150μ seconds, then, after returning to a low state (0.4 VDC max.), it does not change for at least another 150μ seconds (see FIG. 4). This combined 300μ seconds gives the keyboard ample time to set up all the information. Approximately 15 m seconds after the DSR line is set low, the first of nine 20μ seconds strobes pulse. In FIG. 5, data bits DB 1-8, for this case, would result in a hexadecimal data output of 90.

The data lines then change in 5 to 40μ sec before the second strobe which occurs about 12 msec after strobe 1. This second strobe pulse signals the host that the identifier (ID) byte is available to be read. This is shown on FIG. 5 as C1. The next six succeeding strobes will print the reading of the following statuses: (a) automatic line feed, (b) local/remote, (c) control, (d) caps lock, (e) left shift key, and (f) right shift. The ninth and last strobe signals the final byte in the sequence—the stop byte (hexadecimal 91). No interruption occurs during this sequence and any keys that are actuated during this time are ignored.

Figure 6:
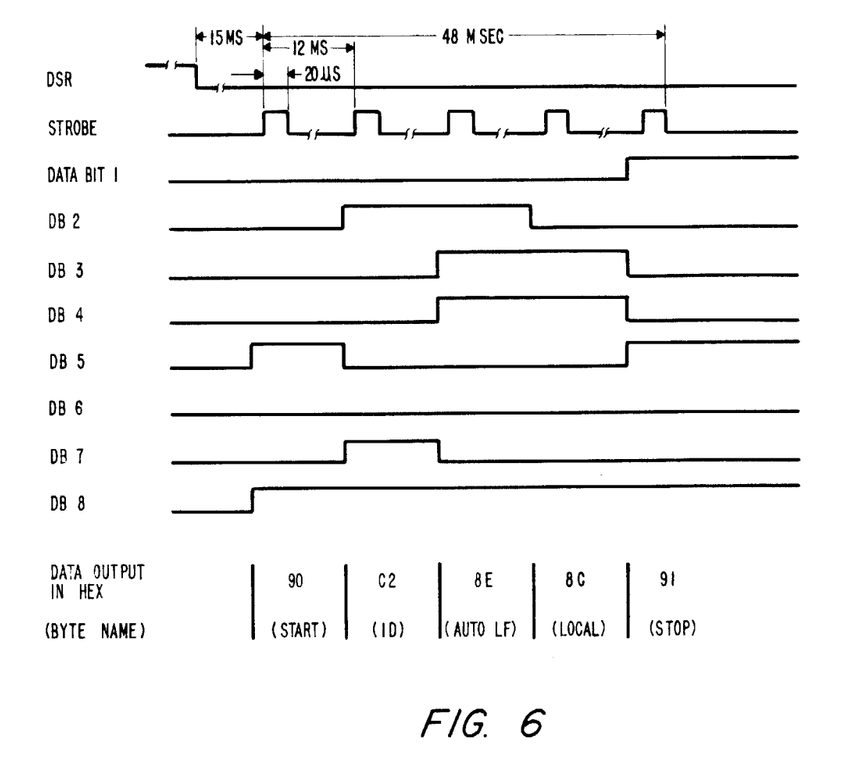
FIG. 6 is a timing diagram of the interface signals for a "hard" (ASCII code) keyboard.

Referring now to FIG. 6, the timing interface signals for a "hard" keyboard will be described. This "hard" keyboard is developed by setting switch E of DIP switch 20-8 to the "off" position; the keyboard 20 analyses the DIP switch setting and determines its identifier byte, which in this case is hexadecimal C2. The keyboard 20 is now ready to send its identifier sequence upon request by the host CPU 12. The signal timing of FIG. 6 is similar to that of FIG. 5; the only notable exception is the number of bytes informing the host CPU 12 of the status of the keyboard 20. The control, caps, lock and shift key functions are not applicable to the host since all their necessary functions are completed internally in this type of keyboard. This is because the keyboard transmits the true ASCII code of each character, less the keyboard status information required by the host CPU 12.

Having shown and described one embodiment of the invention, those skilled in the art will realize that many variations and modifications can be made to produce the described invention and still be within the spirit and scope of the claimed invention. It is the intention, therefore, that the invention be limited only as indicated by the scope of all of the claims.

We claim:

1. A computer terminal keyboard of a data processing system having an identity for a particular use and the capability to change to another identity for another use, said computer terminal keyboard comprising:
    (a) first means for generating a first portion of a code which identifies a first specific configuration of said computer terminal keyboard;
    (b) second means for generating a second portion of the code identifying the first specific configuration of said computer terminal keyboard;
    (c) third means responsive to a query electronic signal from a host computer of said data processing system for commencing a series of operations to identify the configuration of said computer terminal keyboard to said host computer;
    (d) fourth means coupled to said third means and said first means for comparing said first portion of the code with a predetermined value;
    (e) fifth means coupled to said first means, said second means, said third means and said fourth means for combining said first and said second portions of the code into an ID byte when said fourth means indicates that said first portion of the code is equal to the predetermined value;
    (f) a keyboard means coupled to said third means, having a plurality of keys; and
    (g) sixth means coupled to said third means and said fifth means for storing said ID byte, and wherein said series of operations of said third means further identifies a predetermined set of said plurality of keys as being in an "on" or an "off" position, said ID byte and the position of said predetermined plurality of keys identifying said computer terminal keyboard configuration.

2. The computer terminal keyboard as recited in claim 1 including a first group of said predetermined plurality of keys including a automatic line feed, shift and control keys, and cap lock key, and wherein the series of operations identifying the configuration of the computer terminal keyboard identifies a "soft" version, that is, line feed is not set, the shift and control keys are inactive, the cap lock key is active and the keyboard is in remote mode.

3. The computer terminal keyboard as recited in claim 2 wherein said first means in a first state is further coupled to said third means, for generating the "soft" version identification signals to said third means.

4. The computer terminal keyboard as recited in claim 3 including a second group of said predetermined plurality of keys further including a left shift key, a right shift key and a local/remote key, and wherein the series of operations identifying the configuration of the computer terminal keyboard identifies the "hard" version, that is, the control, cap lock, left shift and right shift keys are not applicable, the automatic linefeed is set and the local/remote key is in the local position.

5. The computer terminal keyboard as recited in claim 4 wherein said first means in a second state is coupled to said third means, for generating the "hard" version signals to said third means.

6. The computer terminal keyboard as recited in claim 5 wherein said keyboard means, further including means, coupled to said plurality of keys and said third means, for generating a key location code representative of the position of the keys on said computer terminal keyboard.

* * * * *